(12) United States Patent
Zhang et al.

(10) Patent No.: US 8,806,136 B2
(45) Date of Patent: Aug. 12, 2014

(54) NANDFLASH CONTROLLER AND DATA TRANSMISSION METHOD WITH NANDFLASH CONTROLLER

(75) Inventors: Yong Zhang, Shanghai (CN); Jiangxun Tang, Shanghai (CN)

(73) Assignee: Shanghai Actions Semiconductor Co., Ltd., Shanghai (CN)

( * ) Notice: Subject to any disclaimer, the term of this patent is extended or adjusted under 35 U.S.C. 154(b) by 212 days.

(21) Appl. No.: 13/178,401

(22) Filed: Jul. 7, 2011

(65) Prior Publication Data

US 2011/0264852 A1 Oct. 27, 2011

Related U.S. Application Data

(63) Continuation of application No. PCT/CN2010/072523, filed on May 7, 2010.

(30) Foreign Application Priority Data

May 8, 2009 (CN) .......................... 2009 1 0140439

(51) Int. Cl.
G06F 13/00 (2006.01)

(52) U.S. Cl.
USPC .................................. 711/123; 711/E12.053

(58) Field of Classification Search
CPC ..................................................... G06F 13/28
See application file for complete search history.

(56) References Cited

U.S. PATENT DOCUMENTS

| | | | | |
|---|---|---|---|---|
| 5,255,378 A | * | 10/1993 | Crawford et al. ............. | 710/307 |
| 2004/0221092 A1 | | 11/2004 | Lee | |
| 2004/0236898 A1 | * | 11/2004 | Okumura ..................... | 711/103 |
| 2007/0076484 A1 | * | 4/2007 | Cho et al. ................. | 365/185.21 |
| 2008/0034159 A1 | | 2/2008 | Kim | |
| 2008/0052448 A1 | | 2/2008 | Minz et al. | |
| 2008/0140914 A1 | | 6/2008 | Jeon | |
| 2008/0183953 A1 | * | 7/2008 | Flynn et al. ................... | 711/103 |
| 2009/0094411 A1 | * | 4/2009 | Que ............................. | 711/103 |
| 2013/0007308 A1 | * | 1/2013 | Kikuchi .......................... | 710/19 |

FOREIGN PATENT DOCUMENTS

| | | |
|---|---|---|
| CN | 101303884 A | 11/2008 |
| CN | 101354906 A | 1/2009 |
| GB | 2430512 A | 3/2007 |
| JP | 2008071290 A | 3/2008 |

OTHER PUBLICATIONS

Chinese Office Action (and English translation) in corresponding Chinese Appl. No. 200910140439.3.
Supplementary European Search Report dated Sep. 11, 2013 in EP Patent No. 2378431.

* cited by examiner

*Primary Examiner* — Sean D Rossiter
(74) *Attorney, Agent, or Firm* — Baker & Hostetler LLP (57) ABSTRACT

A Not and Flash (Nandflash) controller and a data transmission method with the Nandflash controller are provided. The Nandflash controller includes a parameter configuration device, configured to receive an operation command from outside, wherein the operation command indicates a current transmission type, number of times needed for transmitting data, size of which is same as that of a buffer in the Nandflash, and command parameters used by each execution; a transmission controlling device, configured to transmit data of a precoded size to/from the Nandflash during each data transmission according to the current transmission type and the command parameters used by this execution the number of times indicated by the operation command. The controller and method advantageously avoid configuring a command for the next operation each time the data of the precoded size is transmitted, save time and clock resources, and greatly improves transmission efficiency.

14 Claims, 7 Drawing Sheets

NANDFLASH CONTROLLER AND DATA TRANSMISSION METHOD WITH NANDFLASH CONTROLLER

CROSS-REFERENCE TO RELATED APPLICATIONS

This application is a Continuation of International Patent Application Ser. No. PCT/CN2010/072523, filed on May 7, 2010, which claims priority to foreign Patent Application No. CN 2009 101 40 439.3, filed on May 8, 2009, the disclosures of which are incorporated herein by reference in their entirety.

TECHNICAL FIELD

The invention relates to memory control technologies, and more particularly, to a Not and flash (Nandflash) controller and a data transmission method with the Nandflash controller.

BACKGROUND OF THE INVENTION

System on Chip (SoC) is one kind of system level chip, which generally includes a Central Process Unit (CPU), a bus, various memory controllers and application devices. The memory controller is used for performing data transmission with external memories of the SoC.

The Nandflash controller is a common memory controller, which performs data transmission with an external Nandflash of a chip. The Nandflash includes a buffer and storage area. The size of the buffer is one page, including a main area for storing data and spare area for storing checksum data. Illustrating with examples, the main area in the buffer includes 2048 bytes (that is, 4 sectors). The spare area of the buffer includes 64 bytes, and is divided into 4 small areas. Each small area is used for storing checksum data corresponding to one sector in the main area. Initial storage location of each sector in the main area, and initial storage location of each area in the spare area are identified with a sector address. Size of above storage area is configured as an integral multiple of the size of the buffer according to actual requirement. Taking one page as a basic storage unit, the initial storage location of each page is identified with a page address.

The data transmission flow between the Nandflash controller and the Nandflash is as follows.

Figure 1:
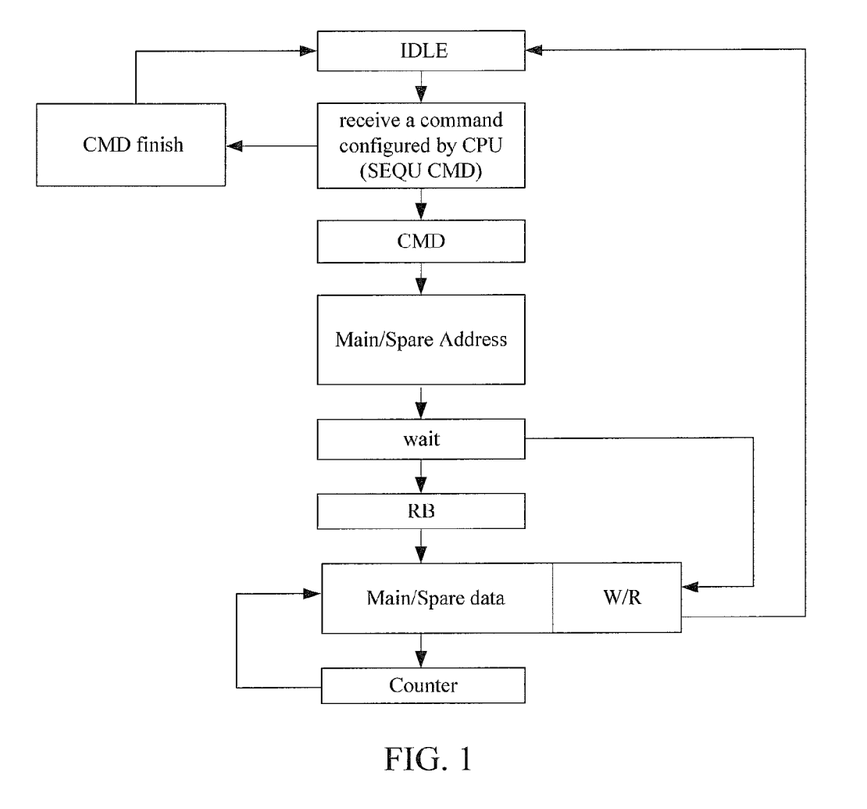
FIG. 1 is a flow chart illustrating a state machine of a Nandflash controller in the prior art.
Figure 1A:
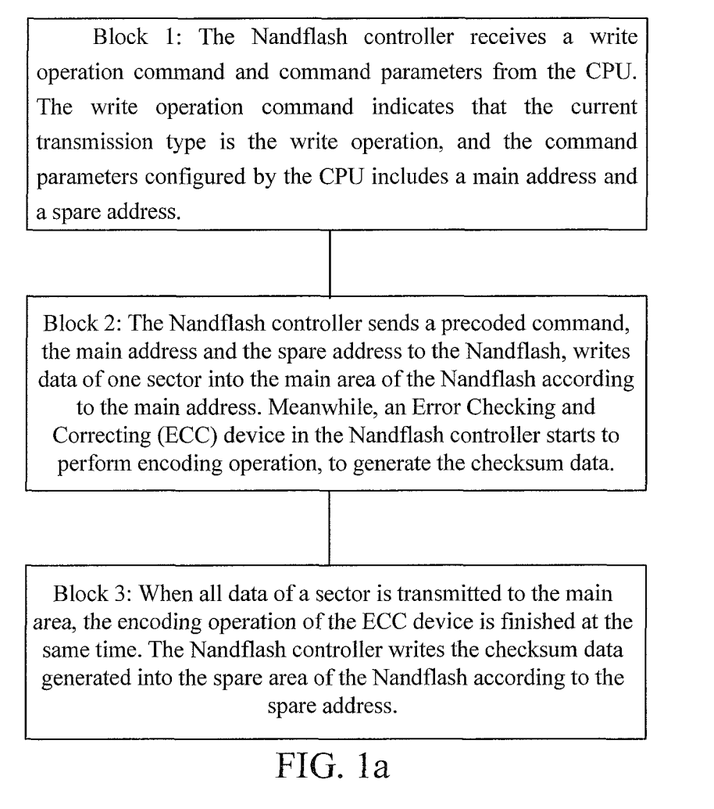
FIG. 1a is a flow chart illustrating a method for writing data in the prior art.

1) Data Transmission in the Write Operation;

FIG. 1a is a flow chart illustrating a method for writing data in the prior art.

Block 1: The Nandflash controller receives a write operation command and command parameters from the CPU. The write operation command indicates that the current transmission type is the write operation, and the command parameters configured by the CPU includes a main address and a spare address.

In the block, the main address includes a main sector address and a page address. The main sector address indicates the initial storage location of the data in the Nandflash buffer. The page address indicates the initial storage location of the data in the Nandflash storage area.

The spare address includes a spare sector address, for indicating the initial storage location of checksum data corresponding to the data in the Nandflash buffer.

Block 2: The Nandflash controller sends a precoded command, the main address and the spare address to the Nandflash, writes data of one sector into the main area of the Nandflash according to the main address. Meanwhile, an Error Checking and Correcting (ECC) device in the Nandflash controller starts to perform encoding operation, to generate the checksum data.

Block 3: When all data of a sector is transmitted to the main area, the encoding operation of the ECC device is finished at the same time. The Nandflash controller writes the checksum data generated into the spare area of the Nandflash according to the spare address.

The specific execution sequence of blocks 2 and 3 has been explicitly defined in the conventional criterions.

After writing the checksum data in block 3, the Nandflash controller returns a transmission completion flag to the CPU. The CPU configures the command for the next write operation, and then returns to block 1, until the data to be written is transmitted.

Supposing that the Nandflash buffer is full after the Nandflash controller executes the above blocks 1-3 for several times. However, the not all data to be written has been transmitted. And then, a write operation command is first sent to the Nandflash between blocks 2 and 3, when executing blocks 1-3 again. The Nandflash reads the data from the buffer and writes the data in the storage area for storage according to the page address. Then, the Nandflash controller starts to execute block 3. It is supposed that the Nandflash buffer is not full, after the Nandflash controller executes the blocks 1-3 repeatedly. However, all data to be written has been transmitted. A write operation command is sent to the Nandflash. The Nandflash writes data in the whole buffer into the storage area according to the page address. However, all data in the un-written part of the buffer is FFn by default. It can be seen that, sector operation of the Nandflash is based on the size of one page, that is, the sector operation is based on size of the buffer.

Figure 1B:
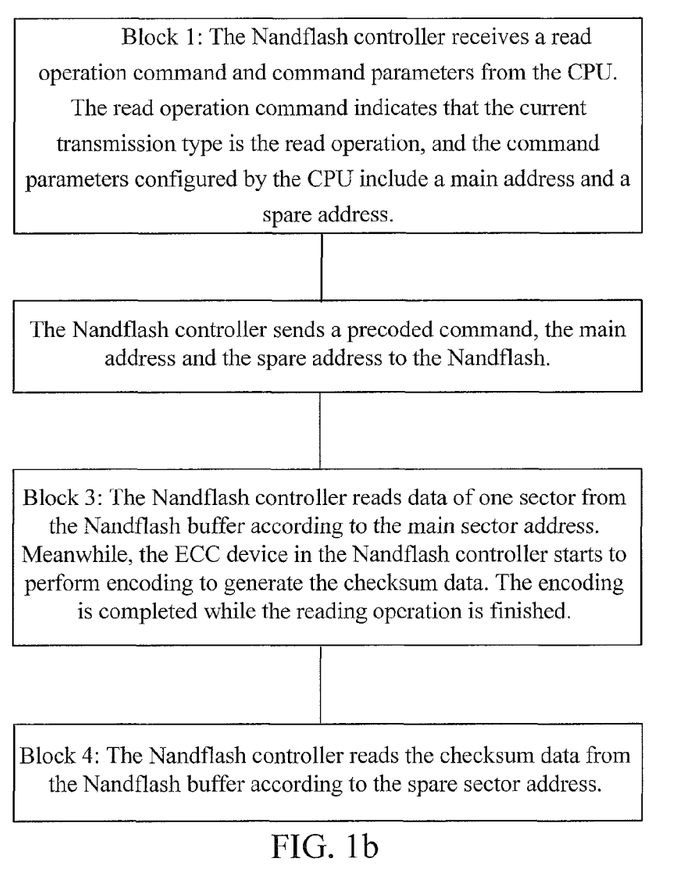
FIG. 1b is a flow chart illustrating a method for reading data in the prior art.

2) Data Transmission During Read Operation:

FIG. 1b is a flow chart illustrating a method for reading data in the prior art.

Block 1: The Nandflash controller receives a read operation command and command parameters from the CPU. The read operation command indicates that the current transmission type is the read operation, and the command parameters configured by the CPU include a main address and a spare address.

The main address and the spare address in the block are same as those introduced above.

Block 2: The Nandflash controller sends a precoded command, the main address and the spare address to the Nandflash. And then, the Nandflash controller waits for the Nandflash to write data of a whole page into the buffer according to the page address. During executing the read operation, the Nandflash first pulls down its RB pin, and pulls up the pin after completing the read operation. The Nandflash needs not to wait, until all the data written into the buffer is read out by the Nandflash.

Block 3: The Nandflash controller reads data of one sector from the Nandflash buffer according to the main sector address. Meanwhile, the ECC device in the Nandflash controller starts to perform encoding to generate the checksum data. The encoding is completed while the reading operation is finished.

Block 4: The Nandflash controller reads the checksum data from the Nandflash buffer according to the spare sector address.

The specific execution sequence of blocks 3 and 4 has been explicitly defined in the conventional criterions.

After finishing block 4, the Nandflash controller decodes the checksum data read and the checksum data generated by the ECC device. If an error is found, the error address and error location are calculated and reported to the CPU. After performing error correction, the CPU configures the next read operation command, and then returns to block 1, until all the data to be read is read out.

If the data transmission process of above Nandflash controller is described at a logic level, a common state machine concept in the logic design is adopted. FIG. 1 is a flow chart illustrating a state machine of the Nandflash controller in the conventional method. The flowing illustrates the data transmission of the above read operation and write operation. Each box represents a state.

Although in the conventional method, the read and write operations in the data transmission of the Nandflash controller are simple and clear, every time one sector is finished, it is required to switch to the CPU from the Nandflash controller to configure commands for next sector operation. As for the state machine, every time the operation of one sector is finished, it is required to configure parameters for the state machine and start up the next state machine. Thus, it is necessary to start up the state machine for many times to complete the data transmission of one page, which costs much time and occupies extra clock resources, thus reduces the data transmission efficiency.

SUMMARY OF THE INVENTION

Embodiments of the invention provide a Nandflash controller, which is able to improve data transmission efficiency.

Embodiments of the invention also provide a data transmission method with a Nandflash controller, by which the data transmission efficiency may be improved.

Technical solution provided by embodiments of the invention is achieved as follows.

A Not and flash (Nandflash) controller, which is configured to perform data transmission with a Nandflash, includes:

a parameter configuration device, configured to receive an operation command from outside, the operation command indicating a current transmission type, execution times needed for transmitting data of size of a buffer in the Nandflash, and command parameters used by each execution;

a transmission controlling device, configured to transmit data of a precoded size with the Nandflash during each data transmission according to the current transmission type and the command parameters used by this execution, until completing the execution times.

A method for performing data transmission with a Not and flash (Nandflash) controller, which transmits data of a precoded size each time performing the data transmission with a Nandflash, includes:

A, receiving, by the Nandflash controller, an operation command from outside, the operation command indicating a current transmission type, execution times needed for transmitting data of the size of buffer in the Nandflash, and command parameters used in each execution;

B, transmitting, by the Nandflash controller, the data of a precoded size according to the current transmission type and the command parameters used in each execution, until completing the execution times.

It can be seen that, in the data transmission method with the Nandflash controller provided by embodiments of the invention, the operation command includes the execution times needed for transmitting the data of the buffer size, command parameters and the current transmission type. Thus, the Nandflash controller may transmit data of the precoded size with the Nandflash each time, and repeatedly execute the transmission operation for many times until completing the transmission of the data of the buffer size, which avoids configuring a command for the next operation each time the transmission of the data of the precoded size is completed. Thus, time and clock resources may be saved, and data transmission efficiency may be improved greatly.

In the Nandflash controller provided by embodiments of the invention, the parameter configuration device may store the configured operation command. The operation command includes the execution times needed for transmitting data of the buffer size, command parameters and the current transmission type. The transmission controlling device may control the transmission executing device to execute the data transmission according to the above operation command. Thus, the Nandflash controller may transmit data of the precoded size with the Nandflash every time, and repeatedly execute the transmission operation for many times until finishing the transmission of the data of the buffer size, which avoids configuring the command for the next operation every time the data transmission of the precoded size is finished. Thus, time and clock resources may be saved, and data transmission efficiency may be greatly improved.

In the Nandflash controller provided by embodiments of the invention, the read and write operation of a whole page may be completed after controlling the whole page of the Nandflash for one time. Thus, the data transmission efficiency may be greatly improved.

EMBODIMENTS OF THE PRESENT INVENTION

To make technical solution and advantages of the invention more clear, detailed descriptions of the invention are further provided in the following accompanying with attached figures and embodiments.

Figure 2:
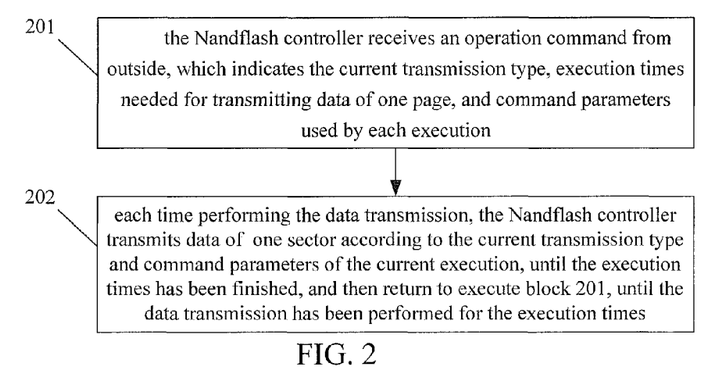
FIG. 2 is a flow chart illustrating data transmission of the Nandflash controller in accordance with an embodiment of the invention.

FIG. 2 is a flow chart illustrating a data transmission method with a Nandflash controller in accordance with an embodiment of the invention. In the embodiment, each time the data transmission is performed by the Nandflash controller and the Nandflash, data of one sector is transmitted. The operation of the Nandflash is based on one whole page. As shown in FIG. 2, the data transmission method includes the following blocks.

Block 201: The Nandflash controller receives an operation command from the outside. The operation command indicates the current transmission type, execution times needed to transmit data of one page, and command parameters used by each execution operation.

Block 202: Each time performing the data transmission, the Nandflash controller transmits data of one sector according to the current transmission type and command parameters used by this data transmission, until the data transmission has been performed for execution times.

It can be seen that, in the data transmission method with the Nandflash controller in the embodiment, the configured operation command includes the execution times needed to complete the data transmission of one page, command parameters and the current transmission type. Thus, each time data of one sector is transmitted between the Nandflash controller and the Nandflash, and the transmission operation is repeatedly executed for many times until completing the transmission of data of one page, which avoids switching to the operation of configuring the next operation command each time data transmission of one sector is finished. Thus, time and clock resources may be saved, and data transmission efficiency may be greatly improved.

Certainly, the flow shown in FIG. 2 only takes common criterions in the conventional method for example. In practical applications, each time data is transmitted between the Nandflash controller and the Nandflash, data of precoded size may be transmitted, which is not limited to transmitting data of one sector each time. The operation of the Nandflash is merely based on the size of its buffer, but is not limited to one page.

The data transmission flows in the read and write operations in the embodiments of the invention are respectively described in detail in the following blocks.

Figure 3:
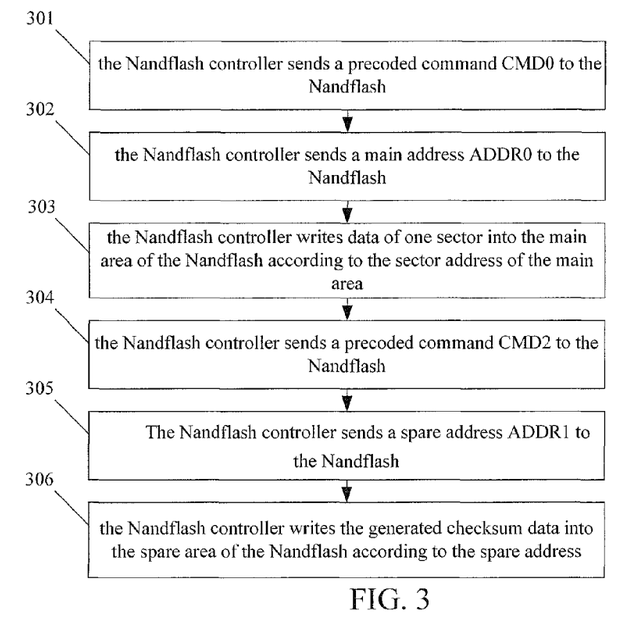
FIG. 3 is a flow chart illustrating data transmission of write operation in accordance with an embodiment of the invention.

FIG. 3 is a flow chart illustrating data transmission of a write operation in accordance with an embodiment of the invention. Before the flow, the Nandflash controller receives a write operation command configured by the CPU, which indicates that the current transmission type is the write operation, execution times needed for transmitting data of one page, command parameters for each execution. In this example, the execution indicates the write operation. The command parameters include a main address. The write operation command further indicates the size of the page. The flow shown in FIG. 3 includes the following blocks.

Block 301: The Nandflash controller sends a precoded command CMD0 to the Nandflash.

In the block, the command CMD0 is a standard command defined in the existed criterion. When performing the write operation, the command indicates writing data into the main area.

Block 302: The Nandflash controller sends a main address ADDR0 to the Nandflash.

In the embodiment of the invention, if the current execution is the first execution of data in the first page, the main address includes a page address and a sector address of the main area. The Nandflash controller needs to compute the initial sector address of the spare area according to the size of the page. If the current execution is the first execution of data in other pages except for the first page, the main address merely includes a sector address of the main area. The Nandflash controller needs to compute the page address of the current execution according to the size of the page and page address used in the previous execution, and compute the initial in-page address of the spare area according to page size. If current execution is at least the second execution of data in other pages except for the first page, the main address only includes a sector address of the main area. The Nandflash controller computes the sector address of the spare area in the current execution with the sector address of spare area used in the previous execution. It can be seen that, the CPU merely needs to configure the page address for the first execution of data in the first page. It needs not to configure the spare address for data in any page. Thus, the configuration operation of the CPU may be simplified.

Block 303: The Nandflash controller writes data of one sector into the main area of the Nandflash according to the sector address of main area.

In the embodiment of the invention, a Direct Memory Access (DMA) controller may be set in the Nandflash controller, so that a DMA channel may be established between the Nandflash controller and the Nandflash.

Meanwhile, the ECC device in the Nandflash controller encodes the data in the sector to generate the checksum data.

Block 304: The Nandflash controller sends a precoded command CMD2 to the Nandflash.

In the block, the command CMD2 is a standard command defined in conventional criterion. During the write operation, the command indicates writing data in the spare area.

Block 305: The Nandflash controller sends a spare address ADDR1 to the Nandflash.

The ADDR1 in the block is computed in block 302 by the Nandflash controller.

Block 306: The Nandflash controller writes the generated checksum data into the spare area of the Nandflash according to the spare address.

The embodiment of the invention may further include the operation of sending an actual write operation command to the Nandflash from the Nandflash controller. The specific process is the same as that in the conventional method, which is not described hereinafter once again.

Figure 4:
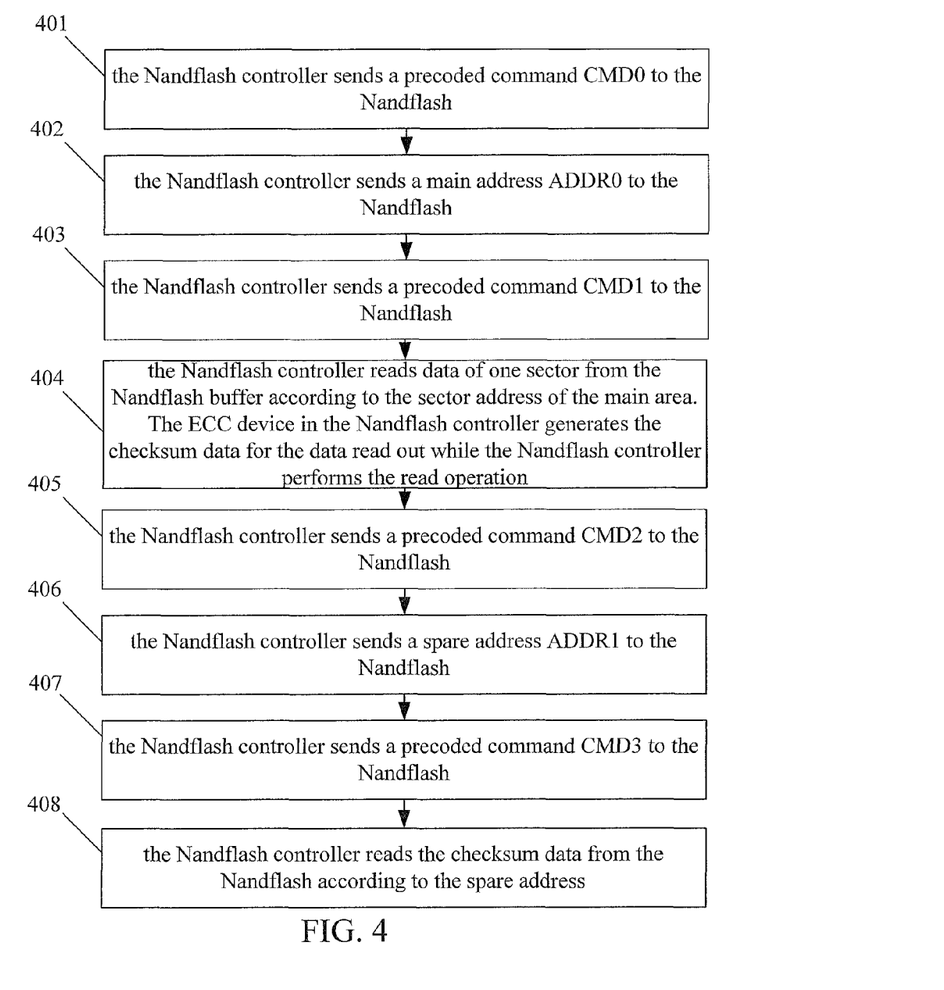
FIG. 4 is a flow chart illustrating data transmission of read operation in accordance with an embodiment of the invention.

FIG. 4 is a flow chart illustrating data transmission in the read operation in accordance with an embodiment of the invention. Before the flow, the Nandflash controller receives a read operation command from the CPU. The read operation command indicates that the current transmission type is the read operation, execution times needed for transmitting data in one page, command parameters for each execution. In this example, the execution indicates the read operation. The command parameters include a main address. The read operation command further indicates the size of the page. The flow shown in FIG. 4 includes the following blocks.

Block 401: The Nandflash controller sends a precoded command CMD0 to the Nandflash.

In the block, the command CMD0 is a standard command defined in the conventional criterion. When performing the read operation, the command indicates reading data from the main area. To distinguish from the CMD0 in block 301, the command may be called CMD0' in this block.

Block 402: The Nandflash controller sends a main address ADDR0 to the Nandflash. The main-area address is the same as that in block 302.

Block 403: The Nandflash controller sends a precoded command CMD1 to the Nandflash.

In the block, the command CMD1 is a standard command defined in the conventional criterion. The read operation is indicated utilizing the command CMD1 and the command CMD0.

If the current execution is the first execution of data in a certain page, the Nandflash controller needs to wait for the Nandflash to read the data of a whole page from the storage area into the buffer firstly according to the page address. If the current execution is at least the second execution of data in a certain page, the waiting process is not needed and the Nandflash controller may directly read the data from the buffer.

Block 404: The Nandflash controller reads data of one sector from the Nandflash buffer according to the sector address of the main area. The ECC device in the Nandflash controller generates the checksum data for the data read out while the Nandflash controller performs the read operation.

In the embodiment of the invention, a DMA controller may be set in the Nandflash controller, so that a DMA channel is established between the Nandflash controller and the Nandflash.

Block 405: The Nandflash controller sends a precoded command CMD2 to the Nandflash.

In the block, the command CMD2 is a standard command defined in the conventional criterion. While the read operation is performed, the command indicates reading data from the spare area. To distinguish from the CMD2 in block 304, the command may be called CMD2' in this block.

Block 406: The Nandflash controller sends a spare address ADDR1 to the Nandflash.

The ADDR1 in the block is computed in block 402 by the Nandflash controller.

Block 407: The Nandflash controller sends a precoded command CMD3 to the Nandflash.

In the block, the command CMD3 is a standard command defined in the conventional criterion. The read operation is indicated utilizing the command CMD3 and command CMD1.

Block 408: The Nandflash controller reads the checksum data from the Nandflash according to the spare address.

In order to ensure that the circulation process is not interrupted, after the above block 408, the Nandflash controller in the embodiment of the invention transmits the checksum data read out to its ECC device. And then, the ECC device performing the decoding operation according to the checksum data read out and the checksum data generated by itself. If an error is found, it needs not let the CPU perform the error correction. Thus, the data transmission efficiency may be further improved.

In the embodiment of the invention, the number of the blocks is merely used for referring to the technical features, but is not used for limiting its execution order.

Figure 5:
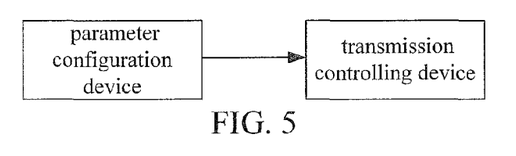
FIG. 5 is a schematic diagram illustrating structure of a Nandflash controller in accordance with an embodiment of the invention.

Based on the data transmission method with the Nandflash controller in the embodiment of the invention, a Nandflash controller is further provided by an embodiment of the invention, FIG. 5 is a schematic diagram illustrating the structure of a Nandflash controller in accordance with an embodiment of the invention. The Nandflash controller is configured to perform data transmission with the Nandflash. In the embodiment, the operation of the Nandflash is based on the size of one page. In practical applications, each time data transmission is performed between the Nandflash controller and the Nandflash, data transmission of precoded size may be completed, which is not limited to the transmission of data of one sector. It is merely required that the operation of the Nandflash is based on its buffer size, but is not limited to the size of one page. As shown in FIG. 5, the Nandflash controller includes a transmission controlling device and a parameter configuration device.

The parameter configuration device is configured to receive an operation command from the outside. The operation command indicates the current transmission type, execution times needed for transmitting data of one page, and command parameters used in each execution.

The transmission controlling device is configured to perform data transmission of one sector with the Nandflash during each data transmission, according to the current transmission type and command parameters used in the current execution, until the data transmission is executed for the execution times.

It can be seen that, in the Nandflash controller of the embodiment of the invention, the parameter configuration device may store configured operation command. The operation command may include execution times needed for transmitting data of one page, command parameters and the current transmission type. The transmission controlling device may perform the data transmission according to contents in the above operation command. Thus, data of one sector may be transmitted between the Nandflash controller and the Nandflash each time, and the data transmission is repeatedly executed for many times until the data of one page is transmitted, which avoids configuring the command for the next operation each time data of one sector is transmitted. Thus, time and clock resources may be saved, and data transmission efficiency may be greatly improved.

Figure 6:
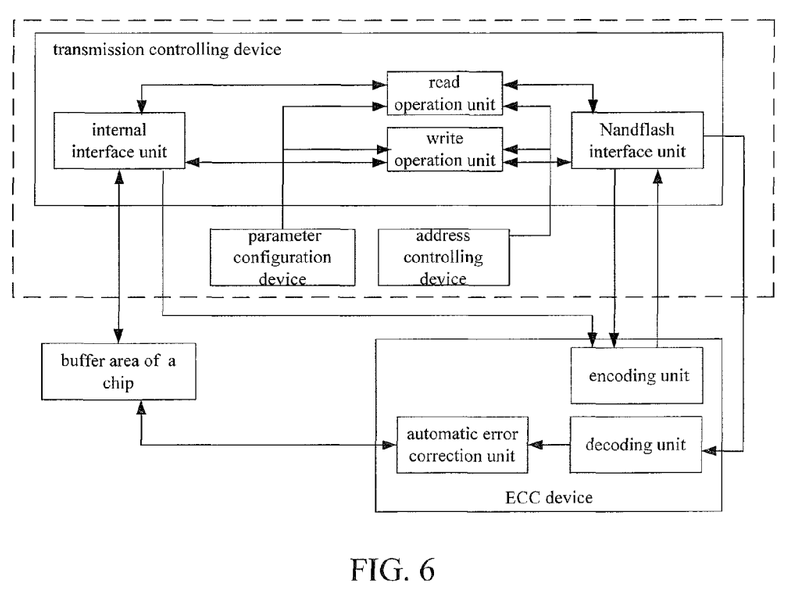
FIG. 6 is a schematic diagram illustrating structure of a Nandflash controller in accordance with another embodiment of the invention.

Preferably, the configured operation command may further indicate the size of one page. The above Nandflash controller further includes an address controlling device, as shown in FIG. 6. FIG. 6 is a schematic diagram illustrating structure of a Nandflash controller in accordance with an embodiment of the invention.

If the current execution is the first execution of data of the first page, the above address controlling device analyzes the main address received by the parameter configuration device, to obtain the page address and the sector address of the main area, compute the initial sector address of the spare area according to the size of the page before the current execution, and provide the obtained initial sector address of the spare area for the transmission controlling device.

If the current execution is the first execution of data in other pages except for the first page, the above address controlling device analyzes the main address received by the parameter configuration device, to obtain the sector address of the main area, computes the page address of the current execution according to the page address of data in the previous page before the current execution, computes the initial sector address of the spare address according to the size of the page, and provides the obtained initial sector address of the spare address to the transmission controlling device.

If the current execution is at least the second execution of data in other pages except for the first page, the above address controlling device analyzes the main address received by the parameter configuration device, to obtain the sector address of the main address, computes the sector address of the spare area in the current execution according to sector address of spare area in the previous execution before the current execution, and provides the computed sector address of the spare area in the current execution for the transmission controlling device.

Therefore, after the address controlling device being set, the CPU only needs to configure the page address for the first execution of data in the first page, and doesn't need to configure spare address for data in any page. Thus, operations of the CPU may be simplified.

The Nandflash controller further includes an ECC device. In such a case, as shown in FIG. 6, the above transmission controlling device includes a write operation unit, a read operation unit, a Nanaflash interface unit and an internal interface unit.

The write operation unit is configured to obtain data of one sector needed to be written through the internal interface unit, send a precoded command CMD0 and the main address to the Nandflash through the Nandflash interface unit, write data of one sector into the main area according to the sector address of the main area and through the Nandflash interface unit, and meanwhile trigger the ECC device to generate the checksum data for data in the sector. The write operation unit is further configured to send a precoded command CMD2 and sector address of the spare area to the Nandflash through the Nandflash interface unit, and write the checksum data generated by the ECC device according to the sector address of the spare area, into the spare area through the Nandflash interface unit.

The read operation unit is configured to send a precoded command CMD0, the main address and the precoded command CMD1 to the Nandflash in turn through the Nandflash interface unit, read data of one sector from the main area through the Nandflash interface unit, meanwhile trigger the ECC device to generate the checksum data for the data of the sector, send the precoded command CMD2, the sector address of the spare area and the precoded command CMD3 to the Nandflash in turn through the Nandflash interface unit, and read the checksum data from the spare area according to the sector address of the spare area and through the Nandflash interface unit.

As shown in FIG. 6, corresponding to the internal structure of the transmission controlling device, the ECC device includes an encoding unit, a decoding unit and an automatic error correction device.

The encoding unit, which is triggered by the write operation unit or the read operation unit, is configured to generate the checksum data.

The decoding unit is configured to decode the data read out by the read operation unit, according to the checksum data generated by the encoding unit and the checksum data read out by the read operation unit, and checks the data obtained by the decoding.

The automatic error correction unit is configured to correct the data read out during the read operation, when the decoding unit detects that the data goes wrong. When the decoding unit detects that the data goes wrong, the automatic error correction unit needs to read the data, which has been written into a certain buffer area of a chip, once again to correct errors. After completing the error correction, the automatic error correction unit writes the data back into its corresponding buffer area. The objective of setting the automatic error correction unit is as follows. In the conventional method, the characteristic of the Nandflash controller is making the CPU perform the error correction each time data of one sector is read out. In order to avoid interrupting the read operation caused by the error correction when data of one page has not been completely read out, the automatic error correction unit is used for directly correcting errors, which avoids switching to the CPU for error correction once error is found, and enhancing the speed of data transmission.

Figure 7:
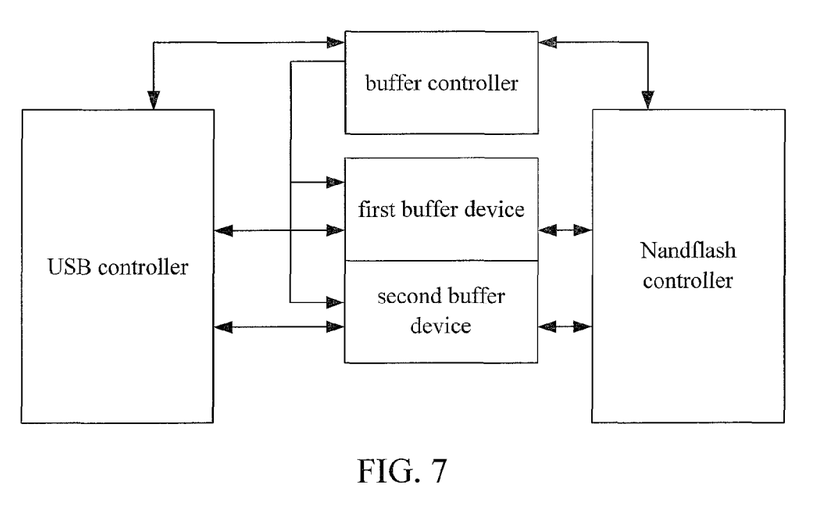
FIG. 7 is a schematic diagram illustrating interaction between a Nandflash controller and a USB controller in accordance with an embodiment of the invention.

Under normal conditions, the Nandflash controller is integrated into a chip. In order to further enhance the speed of data transmission, a first buffer device and a second buffer device with same size and independent of each other are set on the chip in the embodiment of the invention. An embodiment is given in the following descriptions. The above chip may be configured in the interior of a multimedia player. A Universal Serial Bus (USB) controller and a buffer controller may be further set on the chip. The data transmission is performed between the Nandflash controller and the Nandflash, which is located in the interior of the multimedia player and outside of the chip. Meanwhile, the above USB controller connects with a Personal Computer (PC) through a USB interface in the multimedia player. Thus, the Nandflash controller may transmit data read from the Nandflash to the PC through the USB controller, or write the data transmitted by the PC into the Nandflash.

FIG. 7 is a schematic diagram illustrating the interaction between the Nandflash controller and the USB controller in accordance with an embodiment of the invention. Before performing the data transmission between the Nandflash controller and the Nandflash, the Nandflash controller and the USB controller implement handshake operation through the above buffer controller. The specific process is as follows. The initiator sends a drq signal. After receiving the drq signal, the receiver sends an ack signal to the initiator.

When the above handshake is successful, if the Nandflash controller executes the write operation, the USB controller alternately writes data of one sector needed to be written into the first buffer device and the second buffer device. The write operation unit obtains data from the first buffer device and the second buffer device through the internal interface unit and in a sequence contrary to that used by the USB controller for writing the data in the devices.

When the above handshake is successful, if the Nandflash controller executes the read operation, the read operation unit writes data read from one sector into the first buffer device and the second buffer device alternately. The USB controller obtains data from the first buffer device and the second buffer device alternately, in a sequence contrary to that used by the read operation unit for writing the data in the devices.

In above specific execution process, no matter the USB controller or the Nandflash controller reads data from/writes data in the first buffer device and the second buffer device, the buffer controller selects and connects the first buffer device and the second buffer device in turn, to implement above alternate operations. That is to say, the buffer controller completes the scheduling function.

It can be seen that, after setting the first buffer device and the second buffer device on the chip, at which the Nandflash controller locates. The pingpang operation is performed between the Nandflash controller and the USB controller, which may improve the data transmission efficiency.

In view of above, the foregoing only illustrates preferred embodiments of the invention, which is not used for limiting the protection scope of the invention. All the modifications, equivalent substitutions and improvements within the spirit and principle of the invention, should be covered within the protection scope of the invention.

The invention claimed is:

1. A Not and flash (Nandflash) controller, configured to perform data transmission with a Nandflash, comprising:
   a parameter configuration device, configured to receive an operation command from outside, wherein the operation command indicates a current transmission type, number of executions needed for transmitting a precoded amount of data, the precoded amount being the same as a size of a buffer in the Nandflash, and command parameters used by each of the executions; and
   a transmission controlling device, configured to execute transmission of data to or from the Nandflash during each of the executions according to the current transmission type and the command parameters used by the execution until completing the transmission of the precoded amount of data.

2. The Nandflash controller according to claim 1, wherein:
   the data comprises:
      actual data of one sector and checksum data corresponding the actual data; the size of the buffer is the size of one page, which comprises a main area for storing the actual data and a spare area for storing the checksum data; the main area comprises at least two sectors; and the spare area comprises storage areas having the same number as the sectors in the main area; the operation command received from the outside further indicates the size of the page; the command parameters used by each execution comprises a main address;

the Nandflash controller further comprises:

an address controlling device, configured to analyze the main address received by the parameter configuration device to obtain a page address and a sector address of the main area, compute an initial sector address of the spare area according to the size of the page before the transmission controlling device performs the data transmission, and transmit the initial sector address of the spare area to the transmission controlling device when current execution is the first execution of data of the first page;

the Nandflash controller is further configured to:

analyze the main address received by the parameter configuration device, to obtain the sector address of the main address, obtain the page address of the current execution according to the page address of data of the previous page before the transmission controlling device performs the data transmission, compute the sector address of the spare area according to the size of the page, and provide the transmission controlling device with the obtained sector address of the spare area, when the current execution is the first execution of data in other pages except for the first page; and the Nandflash controller is further configured to:

analyze the main address received by the parameter configuration device to obtain the sector address of the main area, compute the sector address of the spare area of the current execution according to sector address of the spare area used in the previous execution before the transmission controlling device executes the data transmission, and provide the obtained sector address of the spare area to the transmission controlling device when the current execution is Nth execution of data in other pages except for the first page; wherein N is an integer larger than 2.

3. The Nandflash controller according to claim 2, wherein:
the Nandflash controller further comprises an Error Checking and Correcting (ECC) device;
the transmission controlling device further comprises a write operation unit, a read operation unit, a Nandflash interface unit and an internal interface unit;
the write operation unit is configured to obtain data of a sector needed to be written through the internal interface unit; send a precoded command CMD0 and main address to the Nandflash through the Nandflash interface unit, write the data of the sector into the main area, according to the sector address of the main area in the main address, through the Nandflash interface unit, trigger the ECC device to generate checksum data for the data of the sector; send a precoded command CMD2 and sector address of the spare area to the Nandflash through the Nandflash interface unit, and write the checksum data generated by the ECC device, according to the sector address of the spare area, into the spare area through the Nandflash interface unit; and
the read operation unit is configured to send a precoded command CMD0', the main address and a precoded command CMD1 to the Nandflash in turn through the Nandflash interface unit, read data of a sector from the main area, according to the sector address of the main area in the main address, through the Nandflash interface unit, trigger the ECC device to generate the checksum data for the data of the sector; send a precoded command CMD2', a sector address of the spare area and a precoded command CMD3 to the Nandflash in turn through the Nandflash interface unit, and read the checksum data from the spare area, according to the sector address of the spare area, through the Nandflash interface unit.

4. The Nandflash controller according to claim 3, wherein:
the ECC device comprises an encoding unit, a decoding unit and an automatic error correction unit;
the encoding unit, triggered by the write operation unit or the read operation unit, is configured to generate the checksum data;
the decoding unit is configured to decode the data read out by the read operation unit with the checksum data generated by the encoding unit and the checksum data read out by the read operation unit, and check decoded data; and
the automatic error correction unit is configured to correct error for the data read out during the read operation when the decoding unit finds an error.

5. The Nandflash controller according to claim 3, wherein:
the Nandflash controller is integrated into a chip, a first buffer device and a second buffer device with the same size and independent of each other, and a Universal Serial Bus (USB) controller are set on the chip;
the USB controller is configured to write data of a sector needed to be written into the first buffer device and the second buffer device alternately;
the write operation unit is configured to obtain the data needed to be written from the first buffer device and the second buffer device on the chip through the internal interface unit, in a sequence contrary to that used by a USB controller on the chip for writing the data of a sector needed to be written into the first buffer device and the second buffer device alternately; and
the read operation unit is configured to write the data read out from the sector into the first buffer device and the second buffer device alternately.

6. The Nandflash controller according to claim 5, wherein the read operation unit or the write operation unit is further configured to execute a handshake operation with the USB controller through a buffer controller on the chip, before the execution.

7. A method for performing data transmission with a Not and flash (Nandflash) controller, in which the Nandflash controller transmits a precoded amount of data each time performing the data transmission with a Nandflash, the method comprising:

A) receiving, by the Nandflash controller, an operation command from outside, the operation command indicating a current transmission type, number of executions needed for transmitting a precoded amount of data, the precoded amount being the same as a size of a buffer in the Nandflash, and command parameters used in each of the executions; and B) transmitting, by the Nandflash controller, data according to the current transmission type and the command parameters during each of the executions until completing the transmission of the precoded amount of data.

8. The method according to claim 7, wherein:
the data comprises actual data of a sector and checksum data corresponding to the actual data;

the size of the buffer is the size of one page, which comprises a main area for storing the actual data and a spare area for storing the checksum data, and the main area comprises at least two sectors, the spare area comprises storage areas having the same number as the sectors in the main area.

9. The method according to claim 8, wherein:

the operation command in method step A further indicates the size of the page, and the command parameters used in each execution comprises a main address;

when the current execution is the first execution of data in the first page, the main address comprises a page address and a sector address of the main area, an initial sector address of the spare area is computed according to the size of the page before performing the current execution;

when the current execution is the first execution of data in other pages except for the first page, the main address comprises a sector address of the main area, a page address of the current execution is obtained according to a page address of data in the previous page before performing current execution, and an initial sector address of the spare area is computed according to the size of the page; and when the current execution is Nth execution of data in other pages except for the first page, the main address comprises a sector address of the main area, and the sector address of the spare area in current execution is computed according to the sector address of the spare area in the previous execution before performing the current execution; wherein N is an integer larger than 2.

10. The method according to claim 9, wherein the transmission type in a method step A is a write operation, transmitting the data according to the current transmission type and the method further comprises:

B1) sending, by the Nandflash controller, a precoded command CMD0 and the main address to the Nandflash, writing data of a sector into the main area according to the sector address of the main area in the main address, and performing an encoding operation to generate the validating data for the data in the sector; and B2) sending, by the Nandflash controller, a precoded command CMD2 and a sector address of the spare area to the Nandflash, and writing the generated checksum data into the spare area according to the sector address of the spare area.

11. The method according to claim 9, wherein the transmission type in method step A is a read operation, transmitting the data of the according to the current transmission type and the method further comprises:

B1') sending, by the Nandflash controller, a precoded command CMD0', the main address and a precoded command CMD1 to the Nandflash in turn, waiting for, by the Nandflash controller, the Nandflash to read the data of a whole page into the buffer according to the page address in the main area address when the current execution is the first execution of data in current page; otherwise, directly reading, by the Nandflash controller, the data of one sector from the main area according to the sector address of the main area in the main address, and generating the checksum data for the data of the sector; and B2') sending, by the Nandflash controller, a precoded command CMD2', the sector address of the spare area and a precoded command CMD3 to the Nandflash in turn, and reading the checksum data from the spare area according to the sector address of the spare area.

12. The method according to claim 11, wherein after reading the checksum data in method step B2', the method further comprises:

B3') decoding and verifying, by the Nandflash controller, the data of the sector read out according to the checksum data generated and the checksum data read out, and performing error correction when finding an error.

13. The method according to claim 8, wherein the Nandflash controller is integrated into a chip, before method step A, the method further comprises:

setting a Universal Serial Bus (USB) controller;

setting a first buffer area and a second buffer area with the same size and independent of each other on the chip;

when the transmission type in method step A is a write operation, before transmitting the data during each of the executions in method step B:

writing, by the USB controller, the data into the first buffer area and the second buffer area alternately; and transmitting the data during each of the executions in method step B by reading, by the Nandflash controller, the data alternately from the first buffer area and the second buffer area in a sequence contrary to that used by the USB controller for writing the data during each execution and executing the transmission operation; and when the transmission type in method step A is a read operation, after transmitting the data during each of the execution in method step B:

writing, by the Nandflash controller, the data read out each time into the first buffer area and the second buffer area alternately; and reading, by the USB controller, the data from the first buffer area and the second buffer area alternatively in a sequence contrary to that used by the Nandflash controller for writing the data.

14. The method according to claim 13, wherein:

the chip is set with a buffer controller;

before writing, by the USB controller, the data into the first buffer area and the second buffer area alternately during the write operation, or before writing, by the Nandflash controller, the data read out each time into the first buffer area and the second buffer area alternately during the read operation, and the method further comprises performing, by the Nandflash controller and the USB controller, a handshake operation through the buffer controller.

\* \* \* \* \*